US012729923B2

(12) United States Patent
Zagone et al.

(10) Patent No.: US 12,729,923 B2
(45) Date of Patent: Sep. 8, 2026

(54) TRANSLUCENT MAGAZINE FOR A FIREARM

(71) Applicant: Magpul Industries Corp., Austin, TX (US)

(72) Inventors: Peter Zagone, Commerce City, CO (US); Libardo Jimenez, Arvada, CO (US); Nicholas Kielsmeier, Denver, CO (US)

(73) Assignee: Magpul Industries Corp., Austin, TX (US)

( * ) Notice: Subject to any disclaimer, the term of this patent is extended or adjusted under 35 U.S.C. 154(b) by 0 days.

(21) Appl. No.: 19/482,095

(22) PCT Filed: Oct. 14, 2024

(86) PCT No.: PCT/US2024/051221
§ 371 (c)(1),
(2) Date: Nov. 6, 2025

(87) PCT Pub. No.: WO2025/193271
PCT Pub. Date: Sep. 18, 2025

(65) Prior Publication Data

US 2026/0133001 A1 May 14, 2026

Related U.S. Application Data

(60) Provisional application No. 63/590,022, filed on Oct. 13, 2023.

(51) Int. Cl.

| | |
|---|---|
| ***F41A 9/65*** | (2006.01) |
| ***C08L 81/06*** | (2006.01) |
| ***F41A 9/70*** | (2006.01) |

(52) U.S. Cl.
CPC ................ *F41A 9/70* (2013.01); *C08L 81/06* (2013.01); *F41A 9/65* (2013.01); *C08L 2205/025* (2013.01); *C08L 2205/03* (2013.01)

(58) Field of Classification Search
CPC ........................................................ F41A 9/65
See application file for complete search history.

(56) References Cited

U.S. PATENT DOCUMENTS

| | | |
|---|---|---|
| 4,109,401 A | 8/1978 | Musgrave |
| 4,468,875 A | 9/1984 | Harrison et al. |

(Continued)

FOREIGN PATENT DOCUMENTS

| | | |
|---|---|---|
| CN | 103471455 A | 12/2013 |
| JP | 1753475 S | 9/2023 |

(Continued)

OTHER PUBLICATIONS

Amend2, Amend2 AR-15 30-Round Translucent Smoke Mod-C, website located at https://amend2mags.com/amend2-30-round-5.56-mod-c-translucent-model/, retrieved from internet on Feb. 28, 2024, 2024, 2 pages, Amend2 Magazines, Idaho, US.

(Continued)

*Primary Examiner* — J. Woodrow Eldred
(74) *Attorney, Agent, or Firm* — NOD Law PC

(57) ABSTRACT

A translucent magazine for a firearm may be formed from a mixture of Polyetherimide (PEI) and at least one of the following: Polyphenylsulfone (PPSU), Polyethersulfone (PES) and Polysulfone (PSU). The translucent magazine including a follower, floor plate, and a follower spring. The follower being opaque. The follower residing within a casing.

20 Claims, 11 Drawing Sheets

(56) References Cited

U.S. PATENT DOCUMENTS

| | | | | |
|---|---|---|---|---|
| 6,403,684 | B1 | 6/2002 | Jin et al. | |
| D695,378 | S | 12/2013 | Fitzpatrick et al. | |
| 10,030,923 | B1 | 7/2018 | Loveday, IV et al. | |
| 10,066,886 | B2 | 9/2018 | Vilardi et al. | |
| 10,094,630 | B1 | 10/2018 | Loveday, IV et al. | |
| 10,619,959 | B1 | 4/2020 | Loveday, IV et al. | |
| 11,001,945 | B2 | 5/2021 | Wetzel et al. | |
| 11,280,569 | B2 | 3/2022 | Yeates | |
| 11,592,250 | B2 | 2/2023 | No | |
| D987,763 | S | 5/2023 | Overstreet et al. | |
| 12,146,721 | B2 | 11/2024 | Williams et al. | |
| 12,203,719 | B1 * | 1/2025 | Hart | F41A 9/70 |
| 2019/0219351 | A1 | 7/2019 | Weinberg | |
| 2020/0384681 | A1 | 12/2020 | Jeol et al. | |
| 2021/0054186 | A1 | 2/2021 | Jeol et al. | |
| 2022/0136789 | A1 | 5/2022 | Lee et al. | |
| 2022/0307784 | A1 | 9/2022 | Lee et al. | |
| 2022/0357121 | A1 | 11/2022 | Binder et al. | |
| 2023/0235981 | A1 | 7/2023 | Williams et al. | |
| 2025/0207881 | A1 * | 6/2025 | Underwood | F41A 9/70 |

FOREIGN PATENT DOCUMENTS

| | | | |
|---|---|---|---|
| KR | 200207126 | Y1 | 12/2000 |
| TW | D159178 | S | 3/2014 |
| TW | D171098 | S | 10/2015 |
| WO | 2008/137187 | A2 | 11/2008 |
| WO | 2019/144160 | A1 | 7/2019 |

OTHER PUBLICATIONS

Classic Firearms, LLC, SDS Imports 30 Round AR-15 Magazine .223/5.56/300BLK, Polycarbonate Smoke, Anti-Tilt Follower—MAR55630RDMPC, website located at https://www.classicfirearms.com/30-round-ar-magazine-polycarbonate-smoke-mar55630rdmpc/, retrieved from internet on Feb. 28, 2024, 2021, 7 pages, Classic Firearms, LLC, North Carolina, US.

Conventus Polymers LLC, Product Datasheet: Durason PPSU1000HF, Conventus Beyond Polymers, Mar. 2, 2023, 2 pages, Conventus Polymers LLC, New Jersey, US.

Cross Industries Ltd., Home Page; website located at https://crossindustriesinc.com/, retrieved from internet Feb. 28, 2024, 2022, 3 pages, Cross Industries Ltd., CA.

Defensivereview, Lightweight Intermediate Caliber Cartridge Individual Weapon System (LICC IWS): 25+1-Round Suppressed 6.5×43mm/.264 AR-Type Combat/Tactical Carbine for Special Warfare Applications!, website and videos found at https://defensereview.com/lightweight-intermediate-caliber-cartridge-individual-weapon-system-licc-iws-251-round-suppressed-6-5x43mm-264-ar-type-combat-tactical-carbine-for-special-warfare-applications-video/, retrieved Feb. 28, 2024, 2020, 3 pages, DefensiveReview.com, Virginia, US.

Elite Tactical Systems, ETS GEN 2 AR15 Magazine, 30 round, website located at https://www.etsgroup.us/, retrieved from internet Feb. 28, 2024, 5 pages, Elite Tactical Systems, US.

European community design application No. 015056816, examination report dated Jul. 11, 2024. 5 pages.

Hkparts, H&K 30 Round HK MR556/416/AR-15 5.56 Magazine—Black, website found at https://hkparts.net/product/hk-30-round-polymer-magazine-mr556-416-ar15-p15805.htm/, retrieved Feb. 28, 2024 2 pages; HKP, Utah, US.

Lancer Systems, Lancer Advanced Weapons and Components—Home\Magazines, website located at https://lancer-systems.com/, retrieved from internet Feb. 28, 2024, 2024, 3 pages, Lancer Systems, Pennsylvania, US.

Rtgparts Gun Parts and Militaria, AK 30RD 5.56×45mm Clear Magazine, Fits Bulgarian & Yugo Spec, AC-Unity, website found at https://www.robertrtg.com/store/, retrieved from internet on Feb. 28, 2024, 2 pages, RTG Parts LLC, Wyoming, US.

Sabic, Ultem Resin DH1004—Americas, Prospector, Oct. 2008, 4 pages, UL Prospector, US.

Solvay, Technical Data Sheet: Radel R-5800, Solvay Specialty Polymers, Jan. 20, 2021, 6 pages.

Strike Industries, Strike AR-15 magazine (33 Rounds)—Smoke, website located at https://www.strikeindustries.com/, retrieved from internet Feb. 28, 2024, 2023, 4 pages, Strike Industries, Nevada, US.

The Castle Arms, SDS Imports SDS Magazine AR-15 5.56 / .223 30 Round, website found at https://thecastlearms.com/product/sds-mag-ar-55.6223-30rd#product_detail, retrieved on Feb. 28, 2024, 3 pages, Kentucky, US.

Wikipedia, Chauchat, webpage found at https://en.wikipedia.org/wiki/Chauchat, downloaded Feb. 28, 2024, 10 pages, Wikipedia.

Wikipedia, Heckler & Koch G36, webpage found at https://en.wikipedia.org/wiki/Heckler_%26_Koch_G36, downloaded Feb. 28, 2024, 9 pages, Wikipedia.

Wikipedia, Steyr AUG, webpage found at https://en.wikipedia.org/wiki/Steyr_AUG, downloaded Feb. 28, 2024, 14 pages, Wikipedia.

ETS 17 Round (9mm) Mag Fits Glock 17, 18, 19, 19x, 26, 34, 45, 49, Available online at: https://www.etsgroup.us/ETS-Group-Translucent-Glock-17-mag-p/glk-17.htm, 15 pages. Published at least as early as Oct. 26, 2015.

Singapore is Rearing SAR-21 Bullpup Rifle for Home and Export Requirement, Available online at: https://web.archive.org/web/20080225162749/http:/www.janes.com/defence/land_forces/news/idr/idr000531_2_n.shtml, dated May 31, 2000, 4 pages.

Chauchat, Available online at: https://en.wikipedia.org/wiki/Chauchat, 16 pages. Published at least as early as Jan. 25, 2004.

Magpul TMag (training/translucent) Magazine Test in HK 416, Available online at: https://www.youtube.com/watch?v=kSGNmaXMbHI. Published at least as early as Sep. 17, 2024.

300 Blackout 30rd Magazine, Polycarbonate Smoke, Anti-Tilt Follower—MAR55630RDMPC, Available online at: https://www.classicfirearms.com/30-round-ar-magazine-polycarbonate-smoke-mar55630rdmpc/, Classic Firearms. Published at least as early as Dec. 8, 2021.

Amend2® AR-15 Mod-C Smoke, Available online at: https://amend2mags.com/amend2-ar-15-mod-c-smoke-5-56-223-30rd/, Amend2 Mags, 5 pages. Published at least as early as Jul. 26, 2023.

L5AWM® 30 Gen1 Translucent Magazines, Availble online at: https://lancer-systems.com/product/15awm-30-magazine/, Lancer Systems, 1 page. Published at least as early as Aug. 12, 2020.

Strike AR-15 Magazine (32+ Rounds)—Smoke, Available online at: https://www.strikeindustries.com/si-ar-mag.html, Strike Industries, 4 pages. Published at least as early as Jan. 10, 2021.

ETS GEN 2 AR15 Magazine, 30 Round, Available online at: https://www.etsgroup.US/ETS-Group-GEN-2-AR15-Magazine-30-Round-p/ar15-30g2.htm, Elite Tactical Systems, 14 pages. Published at least as early as May 27, 2022.

International Application No. PCT/US2024/051221, Written Opinion dated Sep. 15, 2025, 6 pages.

International Application No. PCT/US2024/051221, International Search Report dated Sep. 15, 2025, 3 pages.

10/10 Cross Mag®, Available online at: https://crossindustriesinc.com/556-mags/, Cross Industries Ltd. Published at least as early as Jan. 2, 2022.

Extended European Search Report and Search Opinion received for EP Application No. 24929929.8, mailed on Apr. 17, 2026, 7 pages.

Office Action received for Korean Patent Application No. 10-2026-7009656, mailed on Apr. 27, 2018, 7 pages (3 pages of English Translation and 4 pages of Original Document).

* cited by examiner 19
29
11
31

29
50
30
35
31
19

TRANSLUCENT MAGAZINE FOR A FIREARM

CLAIM OF PRIORITY UNDER 35 U.S.C. § 119

The present Application for Patent is the United States National Phase of International PCT Patent Application No. PCT/US24/51221 entitled "TRANSLUCENT MAGAZINE FOR A FIREARM" filed Oct. 14, 2024, which claims priority to and the benefit of Provisional Application No. 63/590,022 entitled "TRANSLUCENT MAGAZINE FOR A FIREARM" filed Oct. 13, 2023, both aforementioned applications are hereby incorporated by reference in their entirety herein.

FIELD OF THE DISCLOSURE

The present disclosure relates generally to a translucent magazine for a firearm. In particular, but not by way of limitation, the present disclosure relates to systems, methods and apparatuses for creating a translucent magazine using blends of polyphenylsulfone (PPSU), Polyethersulfone (PES) and/or polysulfone (PSU), and polyetherimide (PEI) materials.

DESCRIPTION OF RELATED ART

Firearm ammunition magazines have historically been made of opaque materials such as metals (or more recently reinforced polymers) due to the mechanical properties required for reliable cartridge feeding in military and sporting arms. However, easy visual identification of ammunition-type and round-count have long been desires leading to numerous attempts to create apertures or transparent portions of magazines. For instance, openings such as holes, slots or windows are often added allowing for varying degrees of visibility and round-count resolution. These openings are typically limited in number and size to prevent dirt and debris ingress which can cause weapon malfunctions. A cautionary example that violated this principle is the Chauchat machinegun magazine which was extremely unreliable in WWI trench warfare due in part to the large openings cut into the sides of the magazine body that often led to jamming due to dirt ingress through those openings. Conversely, one version of the MAGPUL polymer pistol magazines for Glock magazines feature a single small hole to determine a fully-loaded status but does not provide visual feedback for partially-loaded situations. Other pistol magazines have holes at each cartridge position to determine an exact loaded-round count. However, these limited-size openings can be difficult to see especially at distance and are typically positioned on (or towards) the rear of the magazine since the round stack is the most consistent in this area and the holes are unlikely to affect feeding in this location. The projectiles themselves remain obscured. One method to improve visibility (while maintaining strength, durability and reliability) is to add a localized window of transparent material to an otherwise opaque body. The MAGPUL MAG-LEVEL system exemplifies this method which allows significantly better round-count awareness without introducing ingress points for debris. While this system offers improvement in round-count resolution, there still exists the problem of cartridge-type identification (i.e., full-metal jacket, hollow-point, tracer, training, frangible, etc.) since the windows are not located where the projectiles can be observed.

In recent years, translucent magazines have gained popularity for their ability to provide visual confirmation of ammunition count. However, these designs have faced several challenges that limit their widespread adoption, particularly in military applications.

Translucent magazines suffered from reduced material strength compared to their opaque counterparts. The inability to add significant fiber reinforcement without compromising translucency has necessitated the use of thicker walls, often requiring purpose-designed platforms with larger, proprietary magazine wells, such as those found in the STEYR AUG and HK G36.

Another limitation of translucent magazine materials has been their reduced hardness. This characteristic makes them more susceptible to embedding of hard debris like fine sand, potentially affecting feeding function in dirty environments. Additionally, these materials are more prone to wear and aesthetic scuffing, which can diminish their translucent properties over time.

While recent developments have improved the durability of translucent magazines, such as those produced by ETS for AR15/M16 platforms, they still fall short of meeting rigorous military-level requirements for durability. Some manufacturers, like LANCER, have attempted to address this issue by incorporating metal feed lips into their AWS design. However, this hybrid approach introduces potential weak points at the metal-to-polymer interfaces, does not fully resolve the problem of maintaining reliable feeding geometry under rough handling conditions, and still does not address limitations of the translucent portions of the magazine as noted above.

These challenges highlight the need for innovative solutions in translucent magazine design that can combine the benefits of clear visual ammunition confirmation with the durability and reliability required for demanding operational environments.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some aspects, the techniques described herein relate to a magazine for a firearm, the magazine including: a casing body, the casing body being fabricated from a mixture of Polyetherimide (PEI) and at least one of the following: Polyphenylsulfone (PPSU), Polyethersulfone (PES) and Polysulfone (PSU); a follower residing within the casing; a floor plate configured to interface with the casing; and a follower spring coupled between the follower and the floor plate.

In some aspects, the techniques described herein relate to a magazine for a firearm, the magazine including: a casing body, the casing body being fabricated from a mixture of 20-60% Polyetherimide (PEI) and at least one of the following: Polyphenylsulfone (PPSU), Polyethersulfone (PES) and Polysulfone (PSU); a follower residing within the casing; a floor plate configured to interface with the casing; and a follower spring coupled between the follower and the floor plate.

In some aspects, the techniques described herein relate to a magazine for a firearm, the magazine including: a casing body, the casing body being fabricated from a mixture of Polyetherimide (PEI) and at least one of the following: Polyphenylsulfone (PPSU). Polyethersulfone (PES) and Polysulfone (PSU); an opaque follower residing within the casing; a floor plate configured to interface with the casing; and a follower spring coupled between the follower and the floor plate.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
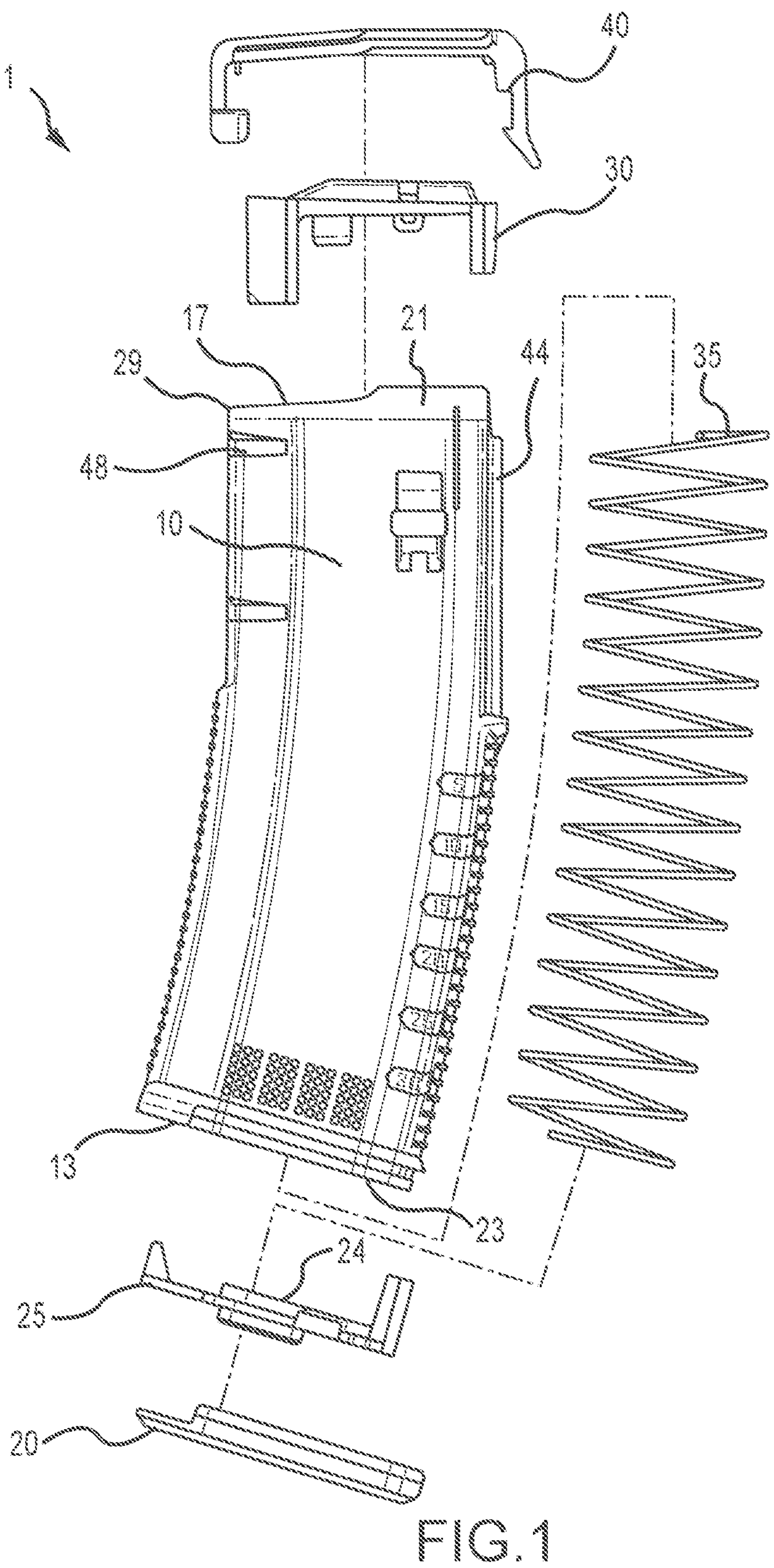
FIG. 1 illustrates an exploded view of a translucent firearm magazine with an impact cover according to an embodiment of this disclosure.

Translucent polymers are structurally weaker than opaque ones, and thus a substantially larger magazine well is sometimes called for to allow for appropriate magazine wall and feed lip thickness. However, magazines designed to fit existing metal magazine wells are forced to achieve translucency with thinner sidewalls. To this end, materials such as PEI, Polyphenylsulfone (PPSU), Polycarbonate (PC), Fiber-Reinforced Thermoplastic Polyurethane (TPU), Polymethyl Methacrylate (PMMA), Polyethersulfone (PES) and Amorphous Polyamide (PA) with or without reinforcement have been considered, but have disadvantages compared to traditional opaque fiber-reinforced polyamide.

Thermoplastic polymers consist of a long chain of molecules, either linear or branched, having side chains or unattached groups of molecules. Usually, thermoplastic materials used in plastic injection molding are commercially available in the forms of pellets, granules, or powders. These materials can be repeatedly melted by heat under pressure so they can be formed and then cooled and hardened into a final desired shape. While polymer and additive degradation can occur during the molding process, chemical changes do not take place, for the most part, during the transformation process. A simple analogy for a thermoplastic material is a wax candle that can be liquefied by heat and then solidify when cooled.

Polymeric thermoplastic materials are an aggregate of long-chained molecular structures. There are two different states, one is known as "crystalline polymers" and the other is known as "amorphous polymers." However, there is no crystalline plastic material exhibiting solely a crystalline structure, but rather they have a mixed structure in which crystalline sections and amorphous sections coexist. This molecular structure is known as "semi-crystalline polymers." Compounding relies on polymerization chemistry to combine a base polymer with modifiers, additives, reinforcements, and other polymers to create new alloys and molecular structures. Compounded polymers can offer better performance, greater strength, and smoother processing at a competitive cost.

Polyetherimide (PEI) is one thermoplastic and is considered a high-performance engineering material. Others include high temperature nylon (polyamide), liquid crystal polymers (LCPs), polysulfone (PSU), fluoropolymers, polyaryletherketone (PAEK), polyphenylene sulfide (PPS), silicone polymers, polyether ether ketone (PEEK) and polyamide. Polyetherimide is an amorphous, amber-to-transparent thermoplastic with characteristics similar to the related plastic PEEK. Relative to PEEK, PEI is lower cost, but is less desirable in terms of impact strength and usable temperature. PEIs are characterized by high strength and rigidity at room and elevated temperatures, long-term high heat resistance, highly stable dimensional and electrical properties, and broad chemical resistance. Unmodified PEI is amber in color and transparent and exhibits inherent flame resistance and low smoke generation without the use of halogenated or other types of flame retarding additives.

The most widely known PEI is sold under the trademark ULTEM™. This high-performance polymer also exhibits high tensile strength, good flame resistance and low smoke emission making it an ideal material of choice in automotive, electrical, medical and other industrial applications. Some in the industry use PEI and ULTEM™ interchangeably, though ULTEM™ is formed from PEI and a small amount of PPS. ULTEM™ was first introduced by General Electric in 1982, and in part due to the impact strength, less usable temperature range, and amber color described above, has yet to be used in the firearms magazine space.

PEI consists of repeating aromatic imide and ether units as seen in the following chemical formula:

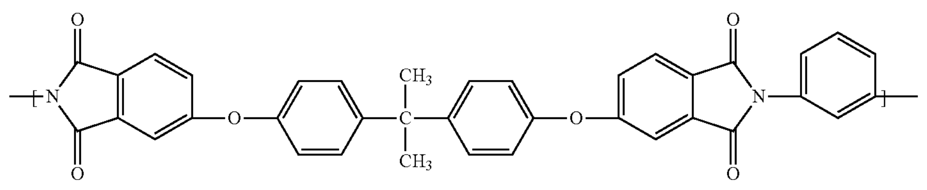

The inventors considered many thermoplastic polymers in developing the herein preferred embodiments. For instance, PPSU did not demonstrate sufficient rigidity and calls for stiffening in the magazine feed lip area (e.g., by an increase in material thickness) to retain ammunition when dropped. Polycarbonate and unreinforced hybrid alloy materials also lack the stiffness to retain rounds under rough handling conditions, exhibit stress whitening as a result of stresses such as drops, fail multiple chemical tests (including acetone and weapon cleaning solvents such as Sweets 7.62 Bore Cleaner) and exhibit creep and material distortion over time. Thermoplastic Polyurethane reinforced material is somewhat opaque (e.g., the projectile shape or bullet ogive is not visible with sufficient clarity) and can obscure other projectile features such as tip geometry and markings. Additionally, TPU also exhibits stress whitening for instance when dropped, fails chemical acetone testing, is susceptible to diethyltoluamide (DEET) and exhibits poor feeding reliability when exposed to silica abrasive dust due to the softness of the material (albeit better than some other translucent magazine materials). Polymethyl methacrylate (PMMA) tends to fail under extreme temperatures in drop testing. Amorphous Polyamide (PA) non-reinforced material deforms on drop tests. PA reinforced material has poor drop performance resulting in large feed lip cracks and poor chemical resistance (as compared to TPU). A polysiloxane abrasion-resistant coating was investigated to improve abrasion resistance and dust test performance of the softer materials but was exorbitantly expensive and had perceived quality issues due to visual defects such as crazing.

PEI (ULTEM™) was formulated to meet specific needs such as electromagnetic interference shielding capability, and thus was not developed for nor recognized as suitable for magazines. Additionally, PEI is available in 4 glass-fiber-reinforced grades (10, 20, 30, and 40% glass), all of which the inventors believed would be beneficial in a magazine, though none meet the translucency needs of a translucent magazine. It also comes in various bearing grades and several high-temperature grades. Thus, there are a myriad of PEI flavors that could be selected—all having some benefit in a magazine application. However, not all PEI grades meet the transparency requirements of a magazine (i.e., the ability to identifying cartridge type). There are well over 600 varieties of PEI that could be selected for a translucent magazine application. Experimentation cannot weed through this vast set of options since the art does not suggest what properties should be given the greatest weight in selecting a best PEI. And, factors such as ammunition capacity, platform geometry, and cartridge type play a significant role, such that a different PEI may be ideal for different use cases—thereby making it difficult to select an optimum PEI across the vast majority of use cases. In addition, many materials may function in typical ambient ranges but may be embrittled in low temperature environments (winter or arctic warfare); or soften, deform and creep in high temperature environments (desert warfare or even vehicular storage under direct sun). Again, there is not a single PEI that best meets all of these considerations. Thus, a selection of materials and ratios is anything but obvious to try.

What is needed is a reasonably cost-effective material that has good translucent properties (without stress whitening), temperature resistance, sufficient strength and stiffness for proper feed lip function during drops and rough handling, and enough hardness to resist abrasive embedding which reduces reliability. These material properties would enable a translucent magazine to meet performance standards previously only attainable with standard opaque magazines (e.g., Magpul's line of PMAGs).

ULTEM™ is not the best choice in isolation, since other materials such as PSU and PES perform better in terms of heat and flowability and PPSU and PSU perform better in terms of moisture uptake. Additionally, ULTEM™ 's impact strength is unfavorable in drop testing (as mentioned herein).

Existing attempts to make suitable translucent magazines have often focused on polyphenylsulfone. For instance, U.S. Pat. No. 10,030,923, assigned to Elite Tactical, discloses a translucent magazine made from polyphenylsulfone (PPSU), and suggests the desirability of PPSU as the lone constituent of a magazine (i.e., without additives). The '923 patent points out challenges of combining PPSU with other materials (e.g., "the magazine is not a hybrid of PPSU and a secondary material, such as a PPSU body with steel feed lips . . . . The dimensional constraints coupled with the increased flex provided a significant challenge in designing a translucent PPSU magazine, particularly without moving to hybrid solutions, which increase the cost and complexity of manufacturing and introduce other issues") (emphasis added). As seen, the '923 patent even teaches away from hybrid designs, suggesting that they add too much cost and complexity to the process. Further, the '923 shows so little interest in hybrid materials, that the '923 patent does not even detail the "other issues" that it suggests are associated with such materials.

Because the '923 patent specified one of the hardest translucent polymers on the market, most translucent additives, such as PEI, would degrade the impact ratings of any resulting mixture of PPSU and other materials. For instance, PEI such as embodied in ULTEM, has a Notched Izod of 6 kJ/m2 and a Notched Charpy of 11 kJ/m2, well below the impact values of PPSU. Thus, there is no motivation to combine PPSU and PEI.

The present disclosure overcomes the challenges of creating a translucent magazine designed for typical magazine wells by going against well-recognized norms and pursing a magazine made from a hybrid of Polyphenylsulfone (PPSU), Polyethersulfone (PES) and/or Polysulfone (PSU) and Polyetherimide (PEI) material. More specifically, the magazine casing can be made from a mixture of about 60-80% PPSU and about 20-40% PEI and optionally one or more of PES and PSU. In other embodiments, the magazine casing can be made from a mixture of substantially 70% PPSU and 30% PEI.

Preliminary note: the flowcharts and block diagrams in the following Figures illustrate the functionality and operation of possible implementations of a magazine according to various embodiments of the present disclosure. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

Figure 4A:
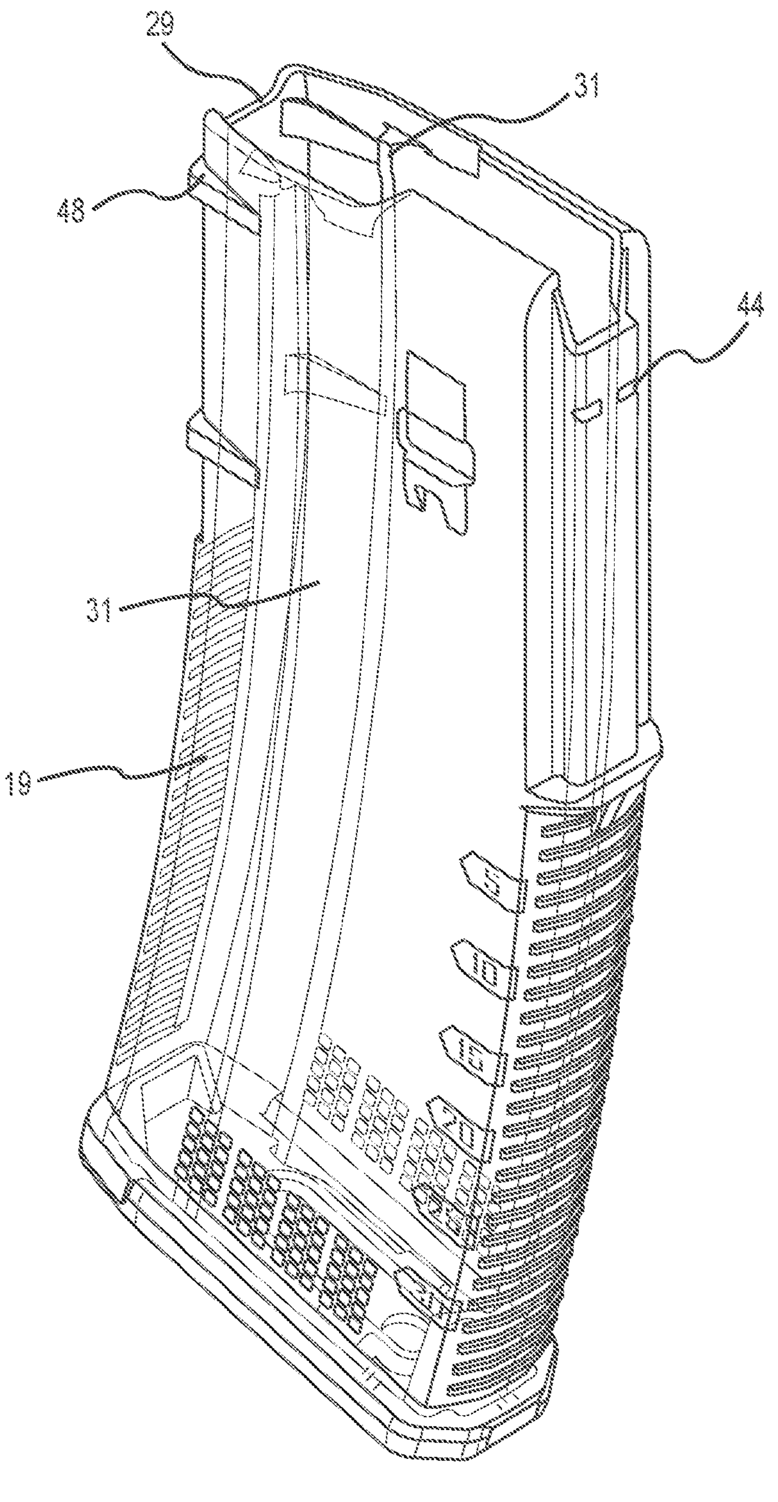
FIG. 4A illustrates a translucent magazine body, without a follower, follower spring, lock plate, or floor plate.
Figure 4B:
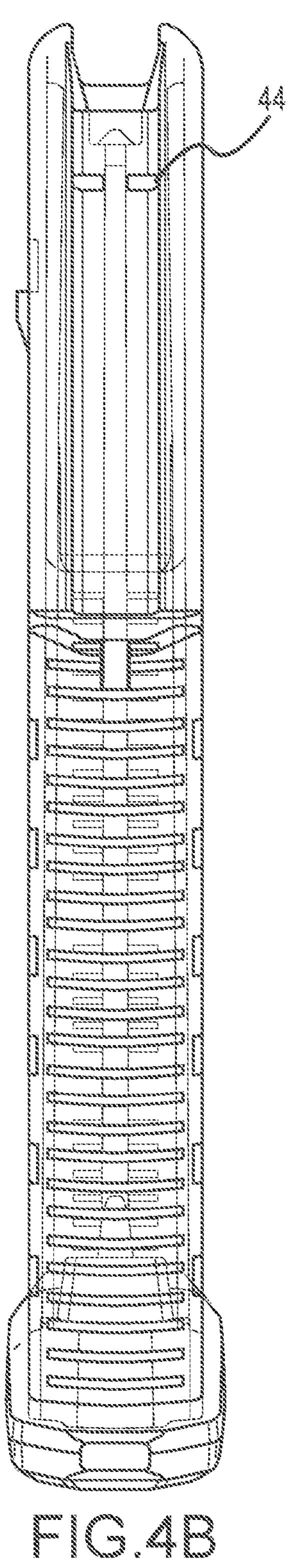
FIG. 4B illustrates a rear view of the translucent magazine of FIG. 4A.

Prior to describing the embodiments in detail, it is expedient to define terms as used in this document. For the purpose of this document, relational terms such as, without limitation, "lateral", "longitudinal", "perpendicular", "parallel", and "flat" shall be understood to mean "within reasonable manufacturing tolerances accepted in the firearms manufacturing industry". The term "longitudinal" shall reference that direction associated with a typical direction of travel or intended travel of a follower and/or cartridges within a firearm magazine, even where no magazine is present. The term "lateral" may reference any direction that is not longitudinal. The term "fore" shall reference that side or direction associated with a firing direction or a nose of a cartridge, while the term "aft" shall reference that side or direction associated with a user position, away from a firing direction. For example, in FIG. 1, the left of the page illustrates the fore region of the magazine 10, and the right side of the page illustrates the aft region of the magazine 10. The term "exterior" shall reference that region intended to interface with a magazine housing, while the term "interior" shall reference that region intended to receive or house a follower spring compressed therein. For example, in FIGS. 4A and 7, the reference "31" is directed towards a structure that is interior of the magazine body 10. The term "nonlinear" shall be understood to mean having a curved region. For example, the guide rails 31 in FIG. 4A are curved (e.g., having a constant curve) and may be considered nonlinear.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the magazine in use or operation in addition to the orientation depicted in the figures. For example, if the magazine in the figures is turned over, elements described as "below" or "beneath" or "under" other elements or features would then be oriented "above" the other elements or features. Thus, the exemplary terms "below" and "under" can encompass both an orientation of above and below. The magazine may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The word "exemplary" is used herein to mean "serving as an example, instance, or illustration." Any embodiment described herein as "exemplary" is not necessarily to be construed as preferred or advantageous over other embodiments.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The following description is in reference to an embodiment of a translucent magazine. However, to more clearly identify certain components, FIGS. 1-3 and 7 show the translucent magazine in an opaque illustration. However, one will note that these illustrations and descriptions do not provide an exclusive or all-inclusive list of translucent magazine components, and in some embodiments, more or fewer components may be seen without departing from the intent of this disclosure. The follower, lock plate and base plate, and follower spring are illustrated as opaque and in many embodiments will be fabricated this way. However, the follower, lock plate and/or floorplate could also be formed as translucent components in other embodiments. However, since these components do not impede the view of the rounds when these components are opaque, ease of manufacture and cost may incentive the use of opaque versions of these components. In fact, it may aid in monitoring the status of rounds if the body is translucent and the follower is opaque.

Figure 2A:
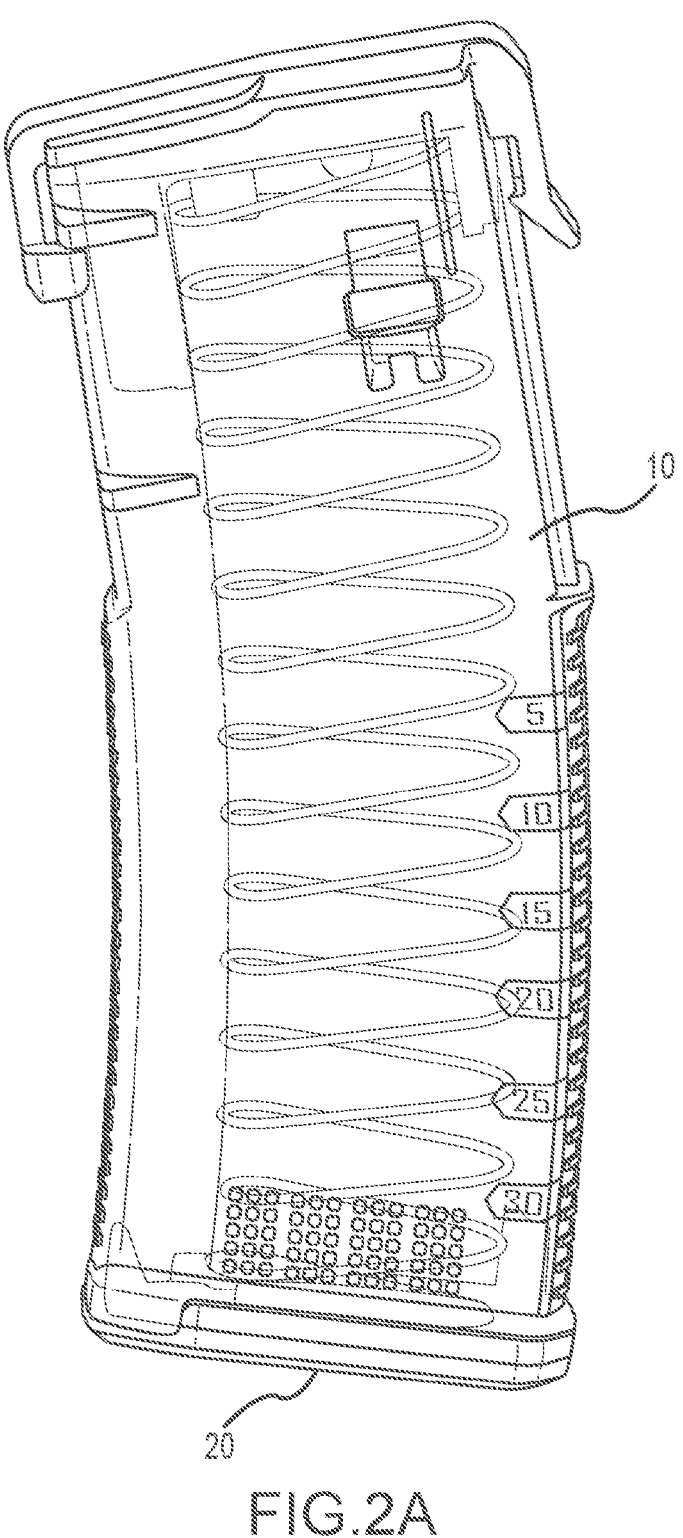
FIG. 2A illustrates a side view of an empty translucent firearm magazine with an impact cover.
Figure 2B:
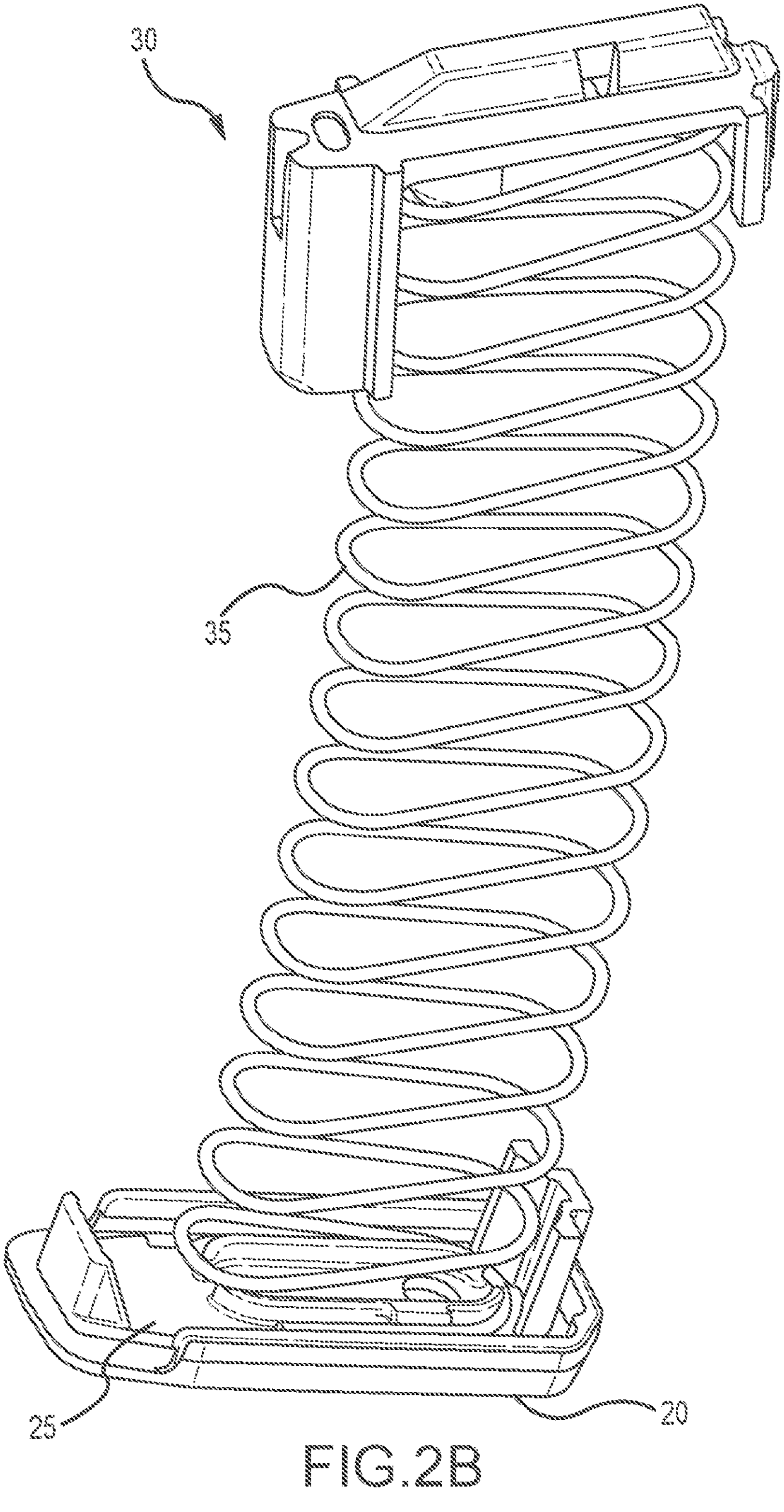
FIG. 2B illustrates a follower, follower spring, floor plate, and lock plate of a translucent firearm magazine.
Figure 3:
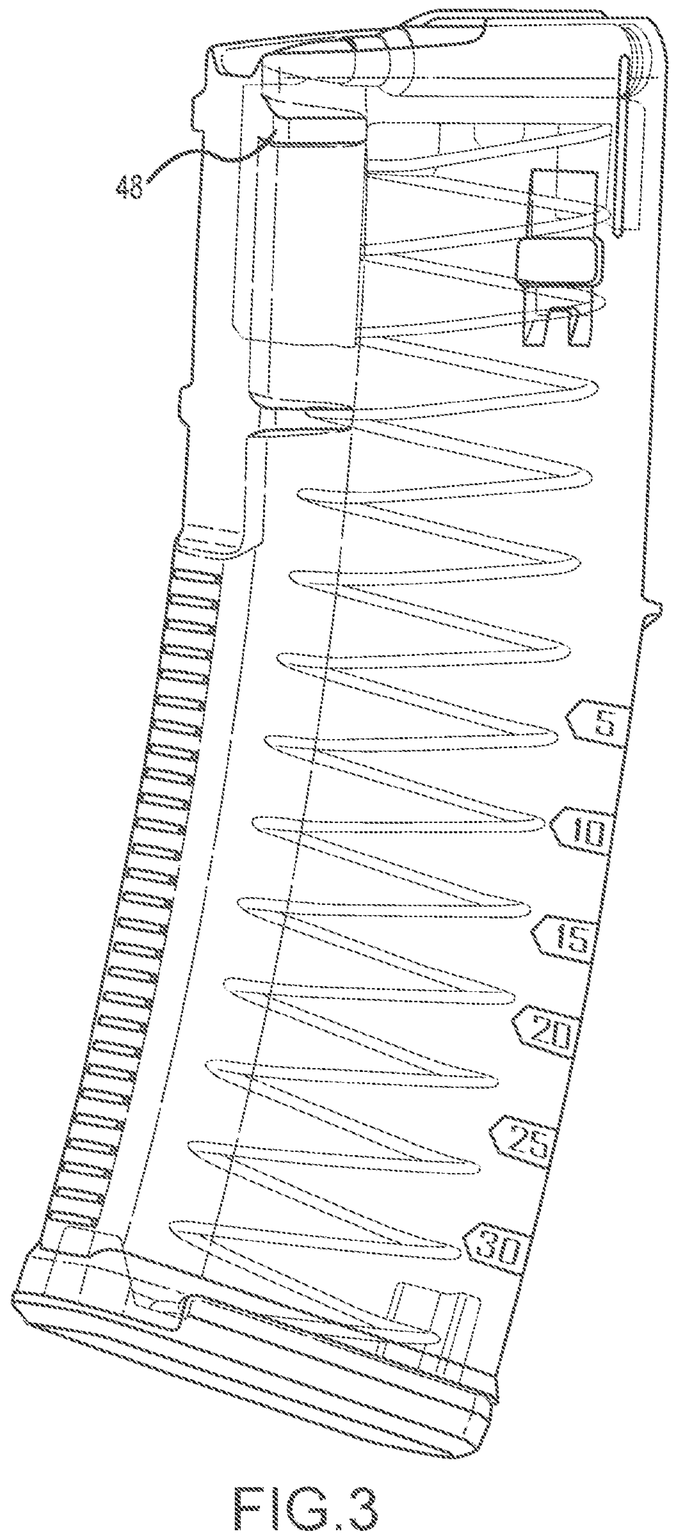
FIG. 3 illustrates a side view of a translucent firearm magazine without an impact cover and with a single cartridge.
Figure 6A:
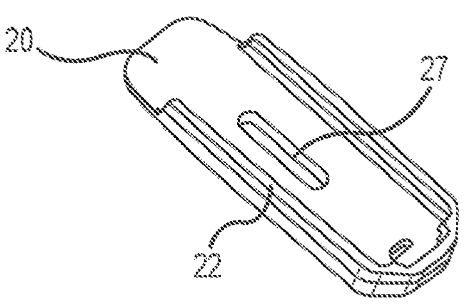
FIG. 6A illustrates a floor plate for use with a translucent magazine.
Figure 6B:
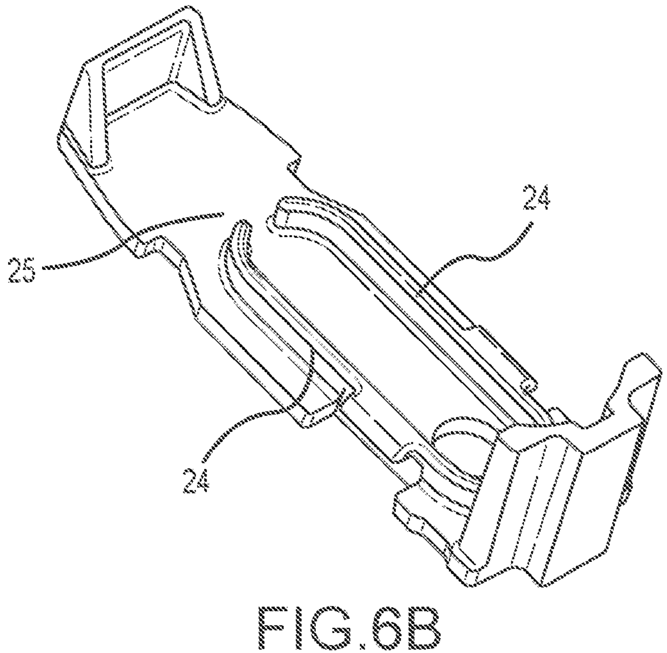
FIG. 6B illustrates a lock plate for use with the floor plate of FIG. 6A.
Figure 6C:
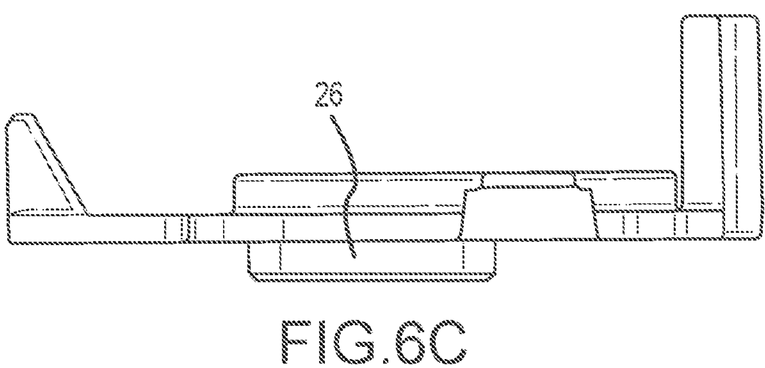
FIG. 6C illustrates a side view of the lock plate of FIG. 6B.

With reference to FIG. 1, a magazine 1 generally comprises a body 10 having a floor end 13 and a feed end 17. Feed lips 21 are provided at the feed end 17 to interface with the ammunition feed mechanism of a weapon and to guide cartridges into the firing chamber of said weapon. The floor end 13 is capped with a floor plate 20 that may slide into place. A lock plate 25 secures a bottom of a follower spring 35 and is centered therein via walls 24 (best seen in FIG. 2B). The follower spring 35 biases the follower 30 toward the feed end 17. The floor plate 20 supports the lock plate 25 and prevents the follower spring 35 from pushing the lock plate 25 out the floor end 13 of the body 10. Floor plate 20 slides over a rim 23 of the floor end 13, using a ledge 22 (best seen in FIG. 6A) to interface with the rim 23, and simultaneously over the lock plate 25. The floor plate 20 and lock plate 25 interface together with a tab 26 (best seen in FIG. 6C) on the lock plate resting within a slot 27 of the floor plate (best seen in FIG. 6A), and this tab 26 ensures that the floor plate cannot be slid off the rim 23 without a user depressing the tab 26. A protective impact cover 40 can be provided for use during storage, and this cover 40 may be able to clip onto the feed end 17 as shown in FIG. 2A and optionally the floor end 13 (not shown) when the magazine 1 is engaged with a firearm. FIGS. 2-3 provide views of the magazine 1 assembled, with FIG. 3 showing the assembled magazine 1 without the impact cover 40.

Figures 7, 8:
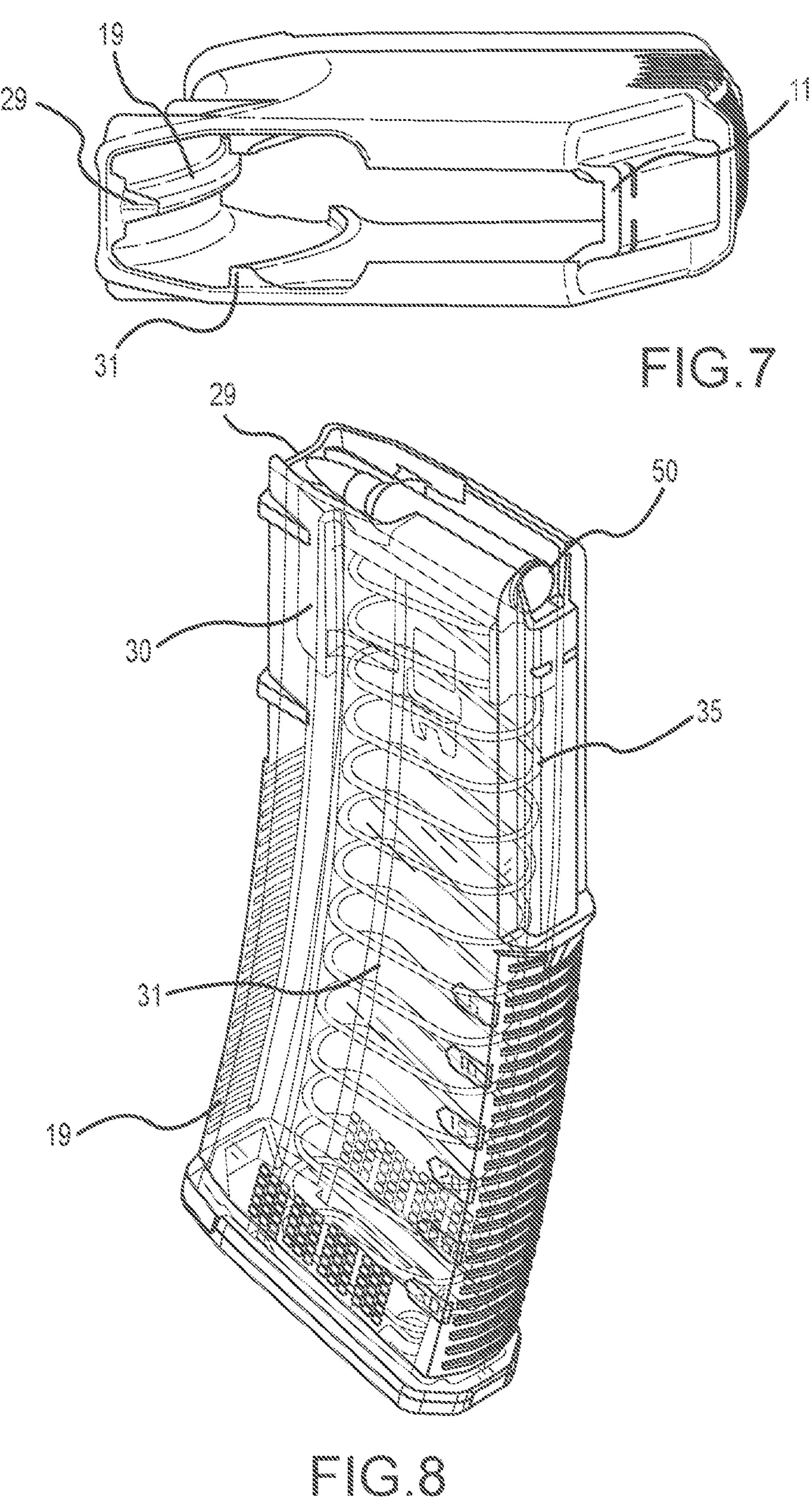
FIG. 7 illustrates a top view of a translucent magazine without a follower, follower spring, lock plate or floor plate.
FIG. 8 illustrates an isometric view of a translucent magazine with a follower, follower spring, lock plate, floor plate, and a single cartridge.
Figures 9, 10:
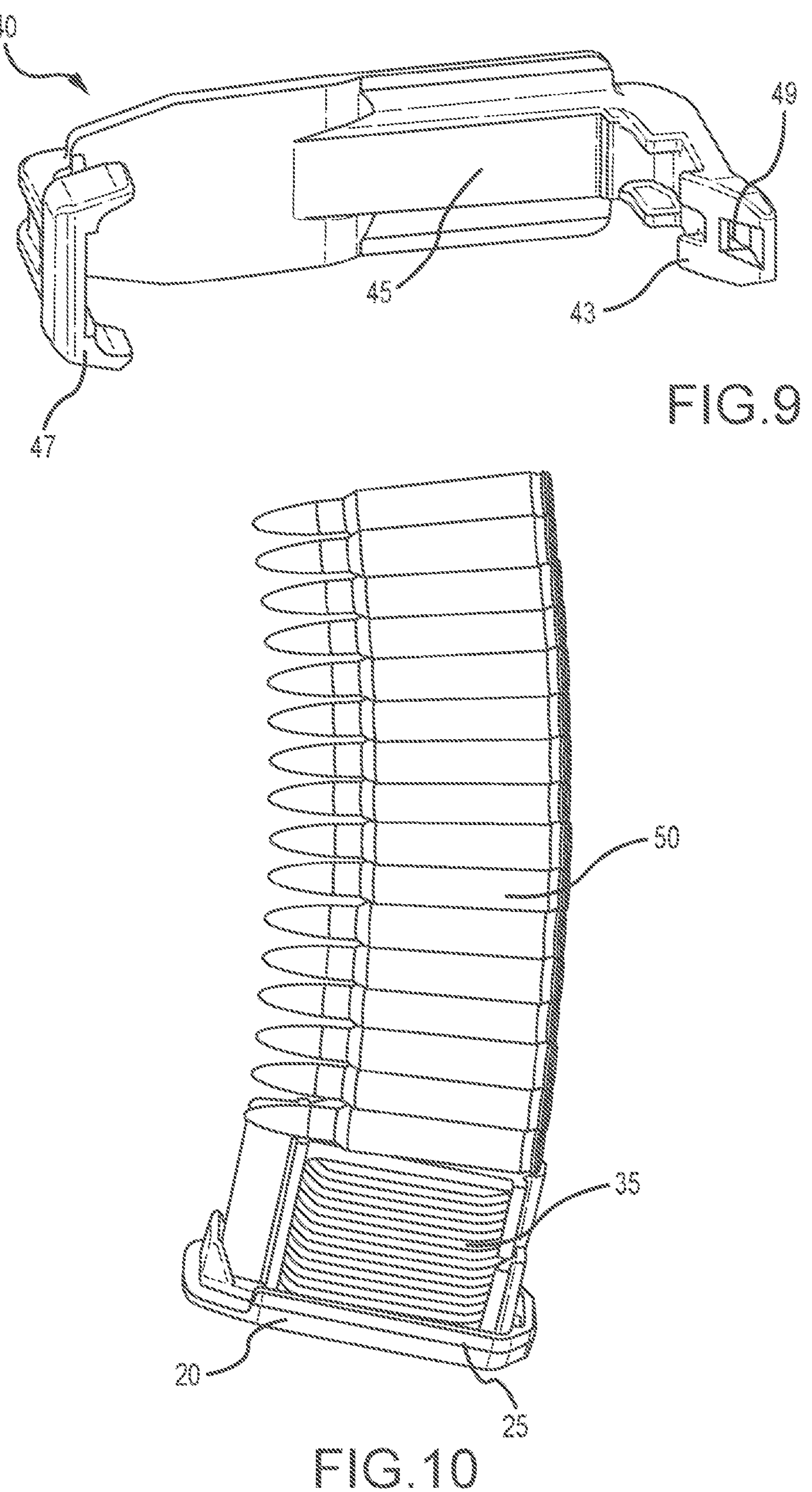
FIG. 9 illustrates a bottom of an impact cover for use with a translucent magazine.
FIG. 10 illustrates a round stack fully compressing a follower spring as might be seen in a fully-loaded translucent magazine.
Figure 11:
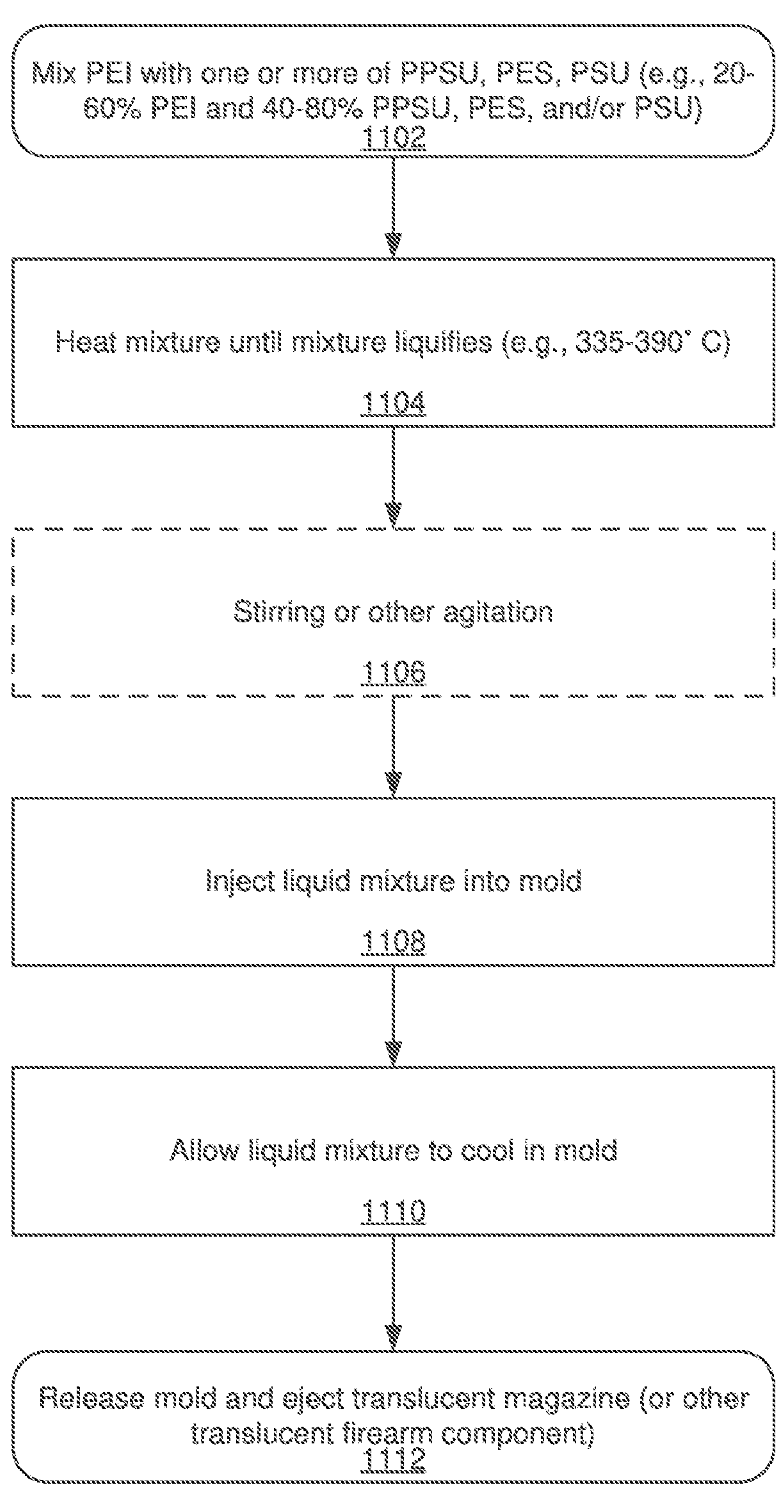
FIG. 11 illustrates a method of manufacturing a translucent magazine according to an embodiment of this disclosure.

Inside the body 10, along the fore side of the magazine 1, may be a ridge 19, shown in FIGS. 4A and 7. The ridge 19 serves three purposes. The first is to provide additional stability and strength to the magazine body 10. The second is to divide tips of cartridges, left from right, in their offset stacking in the magazine. The third is to provide an additional interface with the follower 30 to prevent forward linear and axial tilt. The body 10 also has two lateral guide rails 31 extending through the body 10. The guide rails 31 present a solid surface for the follower to abut and to guide cartridges as they travel through the magazine body 10. The guide rails 31 can each present a flat front (or fore) surface and taper to the inside walls of the body 10, presenting either a trapezoidal or triangular cross-section (when viewed from above). By "flat", applicant means that the fore surface is squared, roughly parallel to the fore and rear sides of the magazine body 10. So as to not interfere with feeding of cartridges into the weapon, the guide rails 31 should terminate at approximately a cartridge's diameter of the feed end 17 of the magazine body (as defined by the level where the rib 19 terminates with or at tab 29), or within ¼ inch for a 0.223 magazine. In other embodiments, the guide rails 31 can extend the entire length of the magazine body 10.

Tab 29 prevents the follower 30 from exiting the feed end 17 of the magazine 1 and helps to reduce follower pressure on the feedlips 21 in an empty magazine condition. It interfaces with a detent 39 (e.g., a chamfered groove) in the follower 30 (FIGS. 5A and 5C) allows the shelf 34 of the follower 30 to move partially past the tab 29 (i.e., the shelf 34 is above a top of the tab 29 in an empty magazine condition.

Figure 5A:
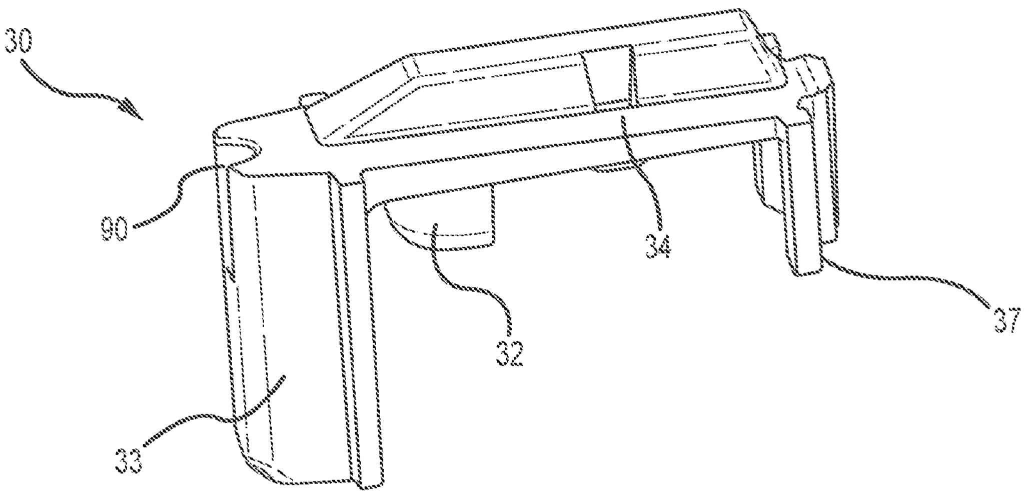
FIG. 5A illustrates a first view of a follower for use in a translucent magazine.
Figure 5B:
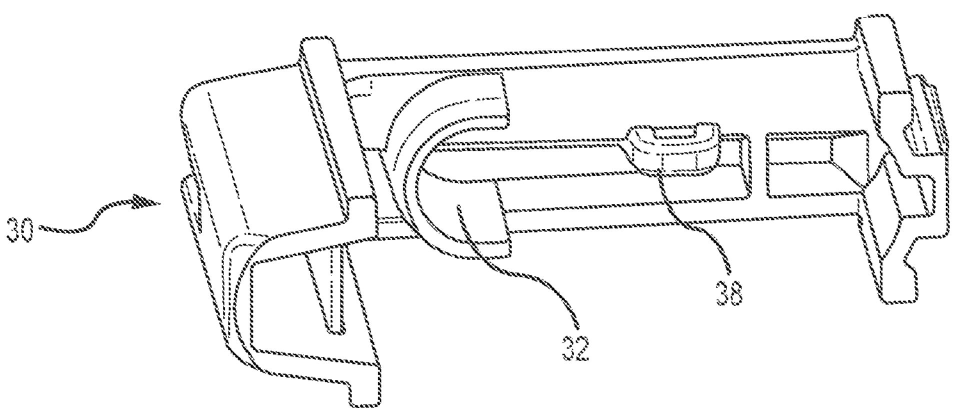
FIG. 5B illustrates a second view of the follower of FIG. 5A.
Figure 5C:
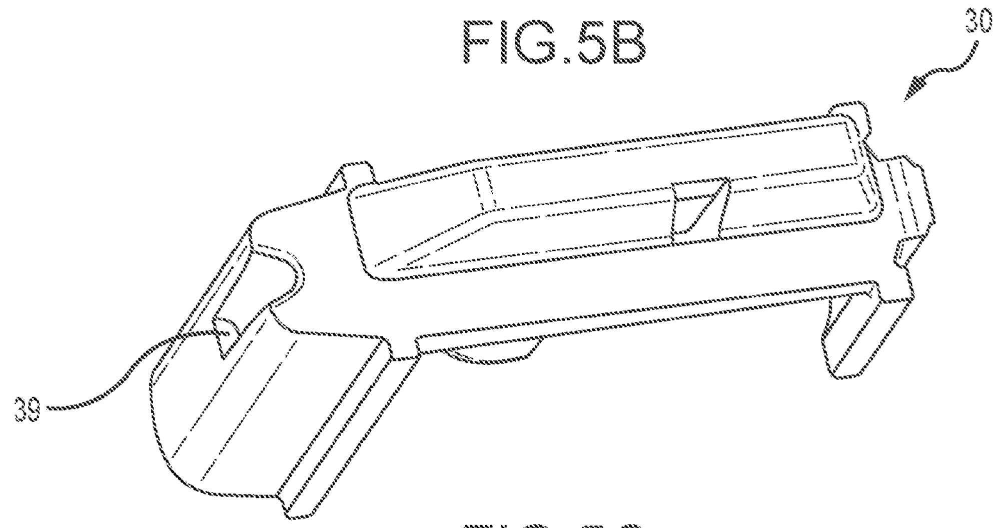
FIG. 5C illustrates a third view of the follower of FIG. 5A.

As shown in FIGS. 5A-5C, the follower 30 has two tines, a forward tine 33 and rear tine 37. Both tines are elongated and extending from platform 34. A front face of the forward tine 33 presses against the ridge 19 and prevents axial movement, particularly those caused by firing the weapon, which would push the rear of the ammunition (and the follower 30) down. The rear portion of rear tine 37 fits into trough 11 (FIG. 7) to aid in restricting lateral movement (or rotation in a roughly horizontal plane) and interfaces with the bolt catch on the weapon to provide last-shot bolt lock-back (or hold-open) on platforms with this functionality. The tines 33, 37 inhibit axial and lateral movement as the tines 33, 37 increase contact with the magazine body 10. Tines with greater vertical extension provide greater stabilizing effects, though even shortened and minimal tines can have a stabilizing effect. The follower 30 interfaces with follower spring 35 by attachment of the follower spring 35 to loop 38 and retention of the follower spring 35 by retaining wall 32.

Protective cover 40, shown in FIGS. 1, 2 and 8, interfaces with geometry, namely notches 44 and hinge base or lock tabs 48, on the magazine body 10 with latch 43 and cover hinge 47 (FIG. 8), and forces the ammunition downward with an underside spacer 45, thereby absorbing and distributing the forces that would normally be applied to the feed lips 21 by a top round in the round stack, thereby reducing long term loads on the feed lips and potential resultant material creep.

The cover 40 also serves as a magazine tool, when detached from the magazine 1, as the cover latch 43 fits between the feed lips 21 to assist a user in stripping out and removing loaded rounds.

It should also be noted that magazine body 10 can present a constant internal curve, with slight straightening near the interior rear face of the feed lips to allow interface with a weapon, seen best in FIG. 4A.

In one embodiment, a portion of the magazine (e.g., floor plate, lock plate, follower, protective cover) is comprised of a long glass-reinforced thermoplastic polymer selected to resist the heat generated from firing a rifle. However, other polymers, like polycarbonate, may be used and the magazines may be made in any color or opacity (which can reduce or eliminate the need for a magazine level indicator). Some polymers, such as polycarbonate, may be used without reinforcement. Other reinforcement materials, such as steel, carbon fiber, or other materials may also be used to reinforce the magazine. Likewise, the portion of the magazine may be made of other materials having suitable strength and durability, such as steel, aluminum, titanium, ceramics, laminates, amorphous metals, etc. In some embodiments, the follower is to be made of polyoxymethylene, acetal resin available commercially from DuPont under the trade name DELRIN®, though other materials are suitable. The magazine body may also feature improvements to aid the user in other manners. At least one paint matrix (or dot matrix) may be added to either the body or floor plate of the magazine. A paint matrix is a plurality of divots in the body of the magazine that can hold paint or ink within the cavities of the divots. An over-insertion stop may also be provided so that the over-insertion stop will contact the lower edge(s) of the magazine well and prevent over-insertion.

In one embodiment, the magazine illustrated in FIG. 1 has a translucent casing body 10 fabricated from a hybrid of PPSU and PEI material. This combined material unexpectedly and synergistically provides clarity of translucence along with high impact strength, high flexural modulus, and surface hardness. For instance and unexpectedly, the translucent magazine formed from PPSU and PEI achieved better drop testing results than either PPSU or PEI in isolation. This was unexpected since PEI has a lower notched Izod and Notched Charpy rating than PPSU and thus a mixture of PEI and PPSU was expected to lead to degraded drop test results.

In addition, this combination allows for higher temperature-resistance, dimensional stability, and good chemical resistance to commonly used military grade cleaning chemicals and solvents, as compared to using PPSU or PEI alone. In conjunction with minimal change over a wide temperature range, the high flexural modulus allows the feed lips to be manufactured in a pre-loaded state. This provides increased tension on the ammunition (especially in a fully-loaded condition) which improves feed lip drop performance. The high surface hardness of the combined materials provides abrasion resistance that can improve feeding due to reduced round stack friction and help reduce surface scuffing thereby maintaining translucency (a need not seen in opaque magazines). The high impact strength provides increased performance in full weapon and feed lip drops.

In other embodiments, magazine 1 illustrated in FIG. 1 has a translucent body 10 fabricated from a hybrid of PEI and one of PPSU, PES (Polyethersulfone) and PSU (Polysulfone), such as 20-40% PEI, up to 5% of an additive, such as a mold release agent, and the remainder comprised of one of PPSU, PES, and PSU. One or more of the floor plate 20, lock plate 25, follower 30, protective cover 40, and follower spring 35, can be opaque, though one or more of these can also be translucent. In some embodiments, portions of a detachable box magazine including the body, floorplate, lock plate, follower, capacity limiter or extension are translucent.

As disclosed herein, the translucent materials disclosed herein have a variety of applications including other firearms and weapons components and accessories (i.e., they are not limited to magazine components). A casing body 10 is referenced for illustration purposes, however, other, variations of detachable or fixed magazines including drum-type magazines may use this technology. For example, in some embodiments, portions of a drum magazine including the feed tower, back plate, front (or cover) plate, follower assembly, loading assembly, or bolt lock-back assembly are translucent and use the above-mentioned combinations of PPSU and PEI or PEI and PPSU/PES/PSU. In other embodiments, the tower of a drum magazine uses the above-mentioned combinations of PPSU and PEI or PEI and PPSU/PES/PSU, but not the drum. In other embodiments, the back of a drum uses the above-mentioned combinations of PPSU and PEI or PEI and PPSU/PES/PSU, to allow viewing of the rear of the cartridges, but not the front. In some embodiments one or more portions of the tower, back plate, front plate, use the above-mentioned combinations of PPSU and PEI or PEI and PPSU/PES/PSU. In some embodiments, the grip, firearm stock, magazine, barrel, action, or other features of a firearm use the above-mentioned combinations of PPSU and PEI or PEI and PPSU/PES/PSU. In some embodiments, other firearm components and accessories such as the receiver, stock, grip, fixed magazine, barrel, sights, various mounts for optical sights, lights, or slings, or grip cover panels/plates use the above-mentioned combinations of PPSU and PEI or PEI and PPSU/PES/PSU. In some embodiments, muzzle accessories such as sound/flash suppressors or blast deflectors use the above-mentioned combinations of PPSU and PEI or PEI and PPSU/PES/PSU. In other embodiments still, the translucent blends may be used for knife handles, tool handles, sheathes, or storage cases and containers for firearms such as pistols or long guns; equipment used in archery, photography, outdoor recreation, medical or military use; or various powered or hand tools.

In some embodiments, the magazine casing body is fabricated with a mixture of 40-80% PPSU and 20-60% PEI. In some embodiments, the magazine casing body is fabricated with a mixture of 40-85% PPSU, PES or PSU and 15-60% PEI. In another embodiment, the casing body is fabricated with a mixture of about 40-60% PPSU and about 40-60% PEI. In another embodiment, the casing body is fabricated with a mixture of about 60-80% PPSU and about 20-40% PEI. In another embodiment, the casing body is fabricated with a mixture of about 40-60% PES or PSU and about 40-60% PEI. In another embodiment, the casing body is fabricated with a mixture of about 60-80% PES or PSU and about 20-40% PEI. In yet another embodiment still, the casing body is fabricated with a mixture of about 70% PPSU and about 30% PEI. In yet another embodiment still, the casing body is fabricated with a mixture of about 60% PPSU and about 40% PEI. In yet another embodiment still, the casing body is fabricated with a mixture of about 70% PES or PSU and about 30% PEI. In yet another embodiment still, the casing body is fabricated with a mixture of about 60% PES or PSU and about 40% PEI. In other embodiments, the casing body is fabricated with at least 30% PEI, and in some embodiments, more than 35%. This disclosure is most applicable to a 30-round box magazine, and adjustments may apply where different sizes and styles of magazines are used.

In yet other embodiments, the casing body is fabricated with between 20-60% PEI, and some or all of the remainder of the mixture being PPSU, PSU and/or PES.

In other embodiments, the casing body is fabricated with between 20-60% PEI, and some or all of the remainder of the mixture being PPSU, PSU and/or PES. In other embodiments, the casing body is fabricated with between 20-40% PEI, and some or all of the remainder of the mixture being PPSU, PSU, and/or PES. In other embodiments, the casing body is fabricated with between 20-50% PEI, and some or all of the remainder of the mixture being PSU or PES. In other embodiments, the casing body is fabricated with between 20-40% PEI, and some or all of the remainder of the mixture being PSU or PES. In other embodiments, the casing body is fabricated with between 20-50% PEI, and some or all of the remainder of the mixture being a mixture of at least two of PPSU, PES or PSU. In other embodiments, the casing body is fabricated with between 20-40% PEI, and some or all of the remainder of the mixture being a mixture of at least two of PPSU, PES or PSU.

Methods of fabricating the translucent material are described herein. In one embodiment, pellets of PEI and one or more of PPSU, PES, and PSU are mixed together as a salt and pepper blend (Block 1102). For instance, the mixture of pellets may comprise 20-60% PEI and 40-80% PPSU, PES, and/or PSU. The mixture of pellets is then heated in a vessel until the mixture temperature reaches 335 to 390 degrees Celsius, which is sufficient to melt the pellets and form a liquid (Block 1104). Stirring or other agitation may be used to homogenize the liquid (optional Block 1106). The liquid can be injected into a mold for the object to be formed (for example, a magazine body or drum cover) (Block 1108), and allowed to cool and solidify within the mold (Block 1110). The solid translucent polymer object can then be ejected from the tool and allowed to further cure and harden (Block 1112). Although the method 1100 describes an injection molding process, the mixture of PPSU and PEI can also be formed into a magazine or other translucent firearms components via extrusion, thermoforming, and compression molding.

In another embodiment, the specific range of desired blends of PPSU and PEI are pelletized together before molding (e.g., before melting the pellets). For example, in an alternative to the method 1100, a blend of approximately 30% PEI and 70% PPSU is pelletized together and used as the feedstock for the molding process 1100, though this is a non-limiting example.

In some embodiments additional materials are added to the PEI and PPSU mixture. For example, in some embodiments, a UV inhibitor, colorant, impact modifier, plasticizer, anti-aging stabilizer, blowing agent, flame retardant, nucleating agent, lubricant, heat stabilizer, anti-static additive, softener, cross-linking additive, odor agent, anti-microbial additive, reclaimed material, filler and/or a mold release agent is added to the mixture. Such additives do not form a significant percentage of the mixture (no more than 5% or 10%).

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A magazine for a firearm, the magazine comprising:
- a casing, the casing being fabricated from a mixture of Polyetherimide (PEI) and at least one of the following: Polyphenylsulfone (PPSU), Polyethersulfone (PES) and Polysulfone (PSU);
- a follower residing within the casing;
- a floor plate configured to interface with the casing; and
- a follower spring coupled between the follower and the floor plate.

2. The magazine of claim 1, wherein the mixture comprises at least PPSU and PEI.

3. The magazine of claim 2, wherein the mixture comprises about 40-80% PPSU and about 20-60% PEI.

4. The magazine of claim 2, wherein the mixture comprises about 60-80% PPSU and about 20-40% PEI.

5. The magazine of claim 2, wherein the mixture comprises about 20-60% PEI and one of PES and PSU.

6. The magazine of claim 2, wherein the mixture further comprises one of PES or PSU.

7. The magazine of claim 2, wherein the casing comprises at least 10% PEI.

8. The magazine of claim 7, wherein the casing comprises at least 15% PEI.

9. The magazine of claim 1, wherein the mixture comprises PEI and one of PES and PSU.

10. The magazine of claim 1, wherein the magazine is a box magazine.

11. A magazine for a firearm, the magazine comprising:
- a casing, the casing being fabricated from a mixture of 20-60% Polyetherimide (PEI) and at least one of the following: Polyphenylsulfone (PPSU), Polyethersulfone (PES) and Polysulfone (PSU);
- a follower residing within the casing;
- a floor plate configured to interface with the casing; and
- a follower spring coupled between the follower and the floor plate.

12. The magazine of claim 11, wherein the mixture comprises PEI and PPSU.

13. The magazine of claim 12, wherein the mixture comprises at least 40% PPSU.

14. The magazine of claim 11, wherein the mixture comprises at least 40% PEI.

15. The magazine of claim 11, wherein the follower is more opaque than the casing.

16. A magazine for a firearm, the magazine comprising:
- a casing, the casing being fabricated from a mixture of Polyetherimide (PEI) and at least one of the following: Polyphenylsulfone (PPSU), Polyethersulfone (PES) and Polysulfone (PSU);
- an opaque follower residing within the casing;
- a floor plate configured to interface with the casing; and
- a follower spring coupled between the opaque follower and the floor plate.

17. The magazine of claim 16, wherein the casing comprises PEI and PPSU.

18. The magazine of claim 16, wherein the casing comprises PEI and at least two of: PPSU, PES and PSU.

19. The magazine of claim 16, wherein a percentage of PEI is greater than 20% and a percentage of PPSU is greater than 40%.

20. The magazine of claim 16, wherein a percentage of PEI is between 20% and 40%.

* * * * *